United States Patent
Chang

(10) Patent No.: US 6,831,697 B1
(45) Date of Patent: Dec. 14, 2004

(54) SURVEILLANCE CAMERA WITH ROTARY CAMERA LENS

(75) Inventor: Mu Jung Chang, Hsinchu (TW)

(73) Assignee: Tranwo Technology Corp. (TW)

( * ) Notice: Subject to any disclaimer, the term of this patent is extended or adjusted under 35 U.S.C. 154(b) by 804 days.

(21) Appl. No.: 09/661,166

(22) Filed: Sep. 13, 2000

(51) Int. Cl.⁷ .............................................. H04N 5/225
(52) U.S. Cl. ...................................... 348/373; 348/375
(58) Field of Search ............................... 348/373–375; 396/419, 490; 248/187.1, 177.1, 186.2, 185.1, 186.1, 183.4, 183.1

(56) References Cited

U.S. PATENT DOCUMENTS 5,734,414 A  * 3/1998 Nishimura et al. ...... 348/14.05
5,933,191 A  * 8/1999 Ariga et al. ................. 348/373
5,977,536 A  * 11/1999 Kempas ....................... 250/216

* cited by examiner

Primary Examiner—Wendy R. Garber
Assistant Examiner—Kelly L. Jerabek
(74) Attorney, Agent, or Firm—Martine & Penilla, LLP

(57) ABSTRACT

The present invention provides a surveillance camera with rotary camera lens comprising a body having a pair of opposed and spaced pivot supports with a receiving space formed therebetween, a pivotable lens seat having two ends and a pivot portion at each of these two ends, and a pivot assembly connected between one of the pair of pivot supports of the body and the pivot portion of the pivotable lens seat so that the pivotable lens seat may be pivotably connected to the body within the receiving space and stopped at any desired pivoting position.

7 Claims, 6 Drawing Sheets

SURVEILLANCE CAMERA WITH ROTARY CAMERA LENS

BACKGROUND OF THE INVENTION

A. Field of the Invention

The present invention relates to a surveillance camera, and particularly to a surveillance camera with rotary camera lens.

B. Description of the Related Art

When surveiling, it is essential for a surveillance camera to adjust the azimuth angle and the elevation angle of its camera lens. With reference to FIG. 1, a conventional surveillance camera consists of a base 11, a body 12, and a camera lens 13. The body 12 is pivotably connected on top of the base 11 with a ball-and-socket joint 14. The camera lens 13 is fixed on the front end of the body 12. Therefore the shooting angle of the camera lens 13 is adjusted by swiveling the body 12 around the base 11.

There are several drawbacks in the conventional surveillance camera as listed below.

1. Though the body 12 can be swiveled around the base 11 in x direction to adjust its azimuth angle, the adjustment of its elevation angle in y direction is greatly restricted. Only a quite slight adjustment in the elevation angle of the body 12 is possible. Besides, since the camera lens 13 is fixed on the body 12, its elevation angle relative to the body 12 cannot be adjusted. As a result, there exist numerous blind comers for surveillance.

2. In the case when the surveillance camera is mounted by attaching its base onto a vertical wall, the camera lens 13 is facing downward in a neutral position. Even by adjusting its elevation angle, the body 12 can hardly reach the horizontal level. Consequently, area above the horizontal level will be out of the surveillant range. This further exposes the limitation of a conventional surveillance camera when mounted by attaching its base onto a vertical wall.

SUMMARY OF THE INVENTION

One object of the present invention is to provide a surveillance camera with a rotary camera lens so that the elevation angle of the camera lens can be adjusted relative to the body to cover a wider range of surveillant area and diminish the blind corner.

In order to achieve the above-mentioned object, the present invention of a surveillance camera with rotary camera lens comprises:
- a body having a pair of opposed and spaced pivot supports with a receiving space formed therebetween;
- a pivotable lens seat having two ends and a pivot portion at each ends;
- a camera lens mounted on the pivotable lens seat; and
- a pivot assembly connected between one of the pivot supports of the body and the pivot portion of the pivotable lens seat so that the pivotable lens seat may be pivotably connected to the body within the receiving space and stopped at any desired pivoting position.

These and other objects, advantages, and characteristics of the present invention will become apparent by reference to the following description and accompanying drawings.

DETAILED DESCRIPTION OF THE EMBODIMENT

Figure 1:
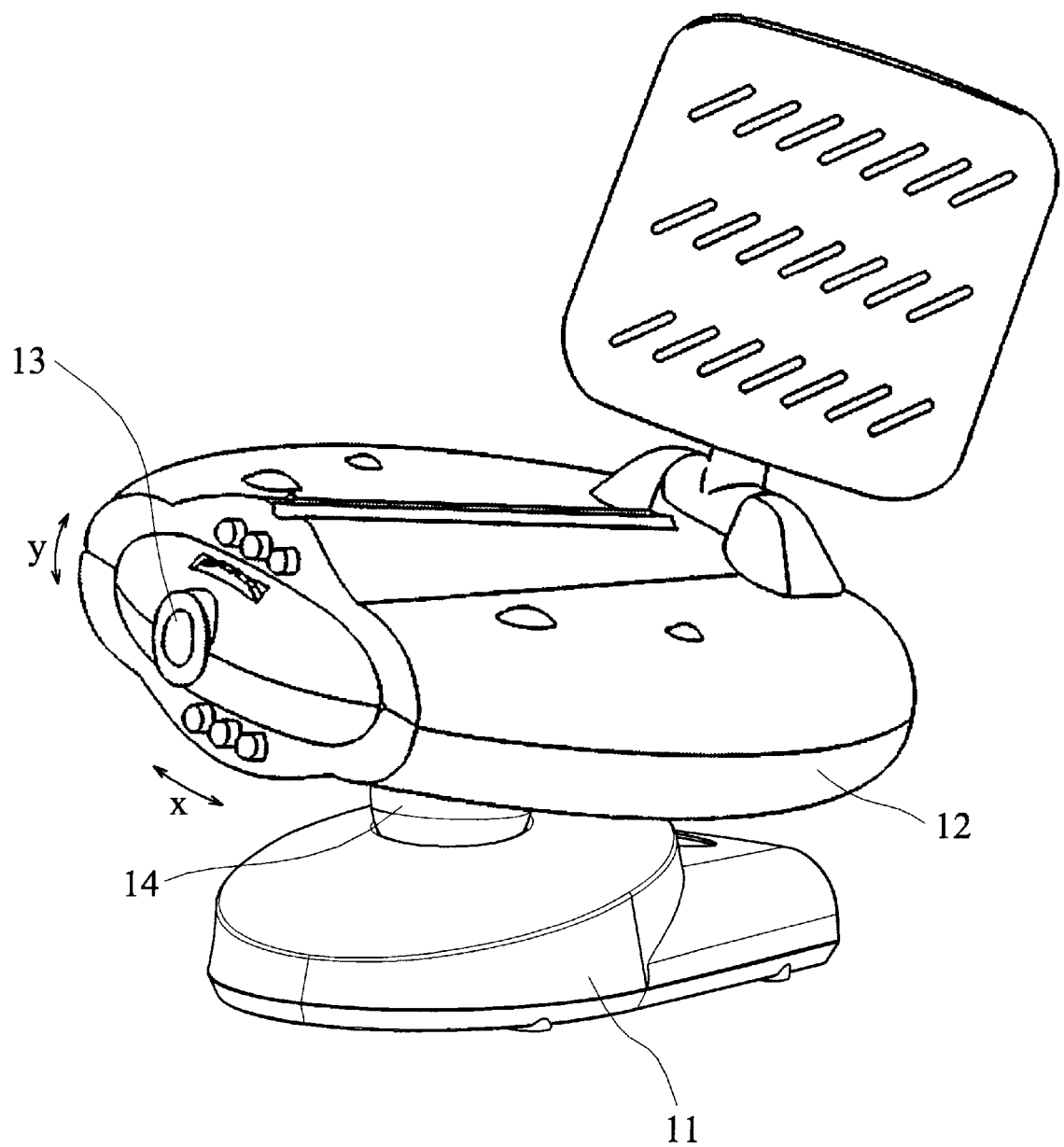
FIG. 1 is perspective view of a conventional surveillance camera.
Figure 2:
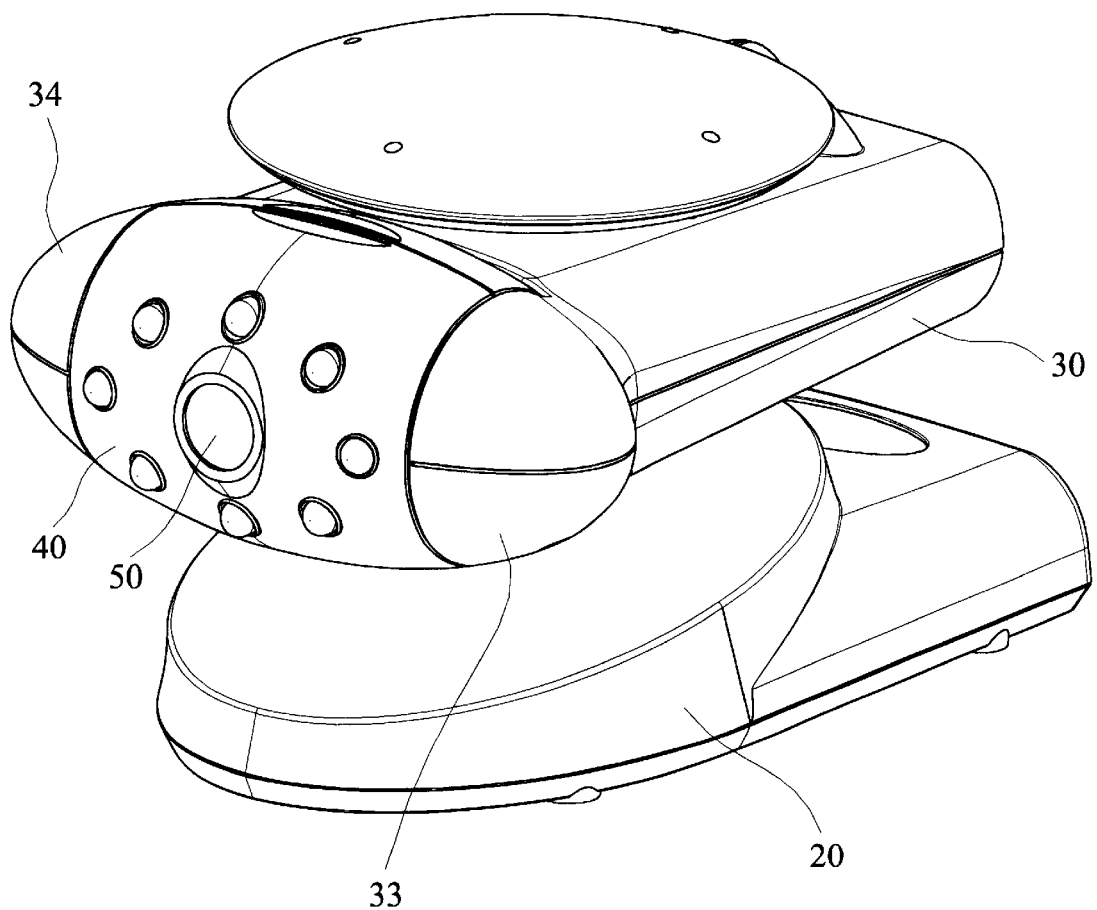
FIG. 2 is a perspective view of a surveillance camera according to a preferred embodiment of the present invention.

As shown in FIG. 2, the surveillance camera according to a preferred embodiment of the present invention includes a base 20, a body 30, a pivotable lens seat 40, a camera lens 50, and a pivot assembly 60.

Figure 3:
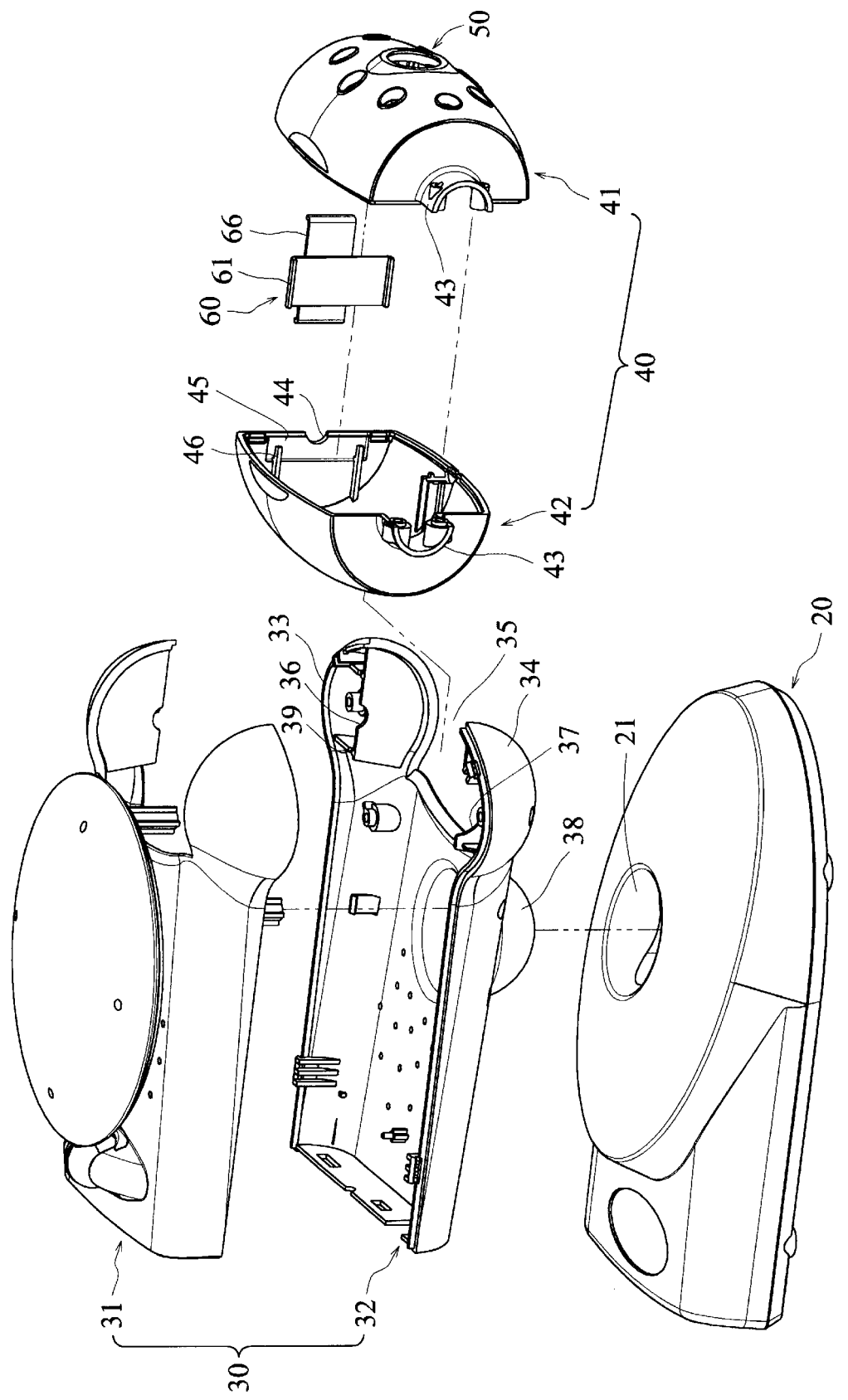
FIG. 3 is an exploded perspective view of the same surveillance camera.
Figure 4:
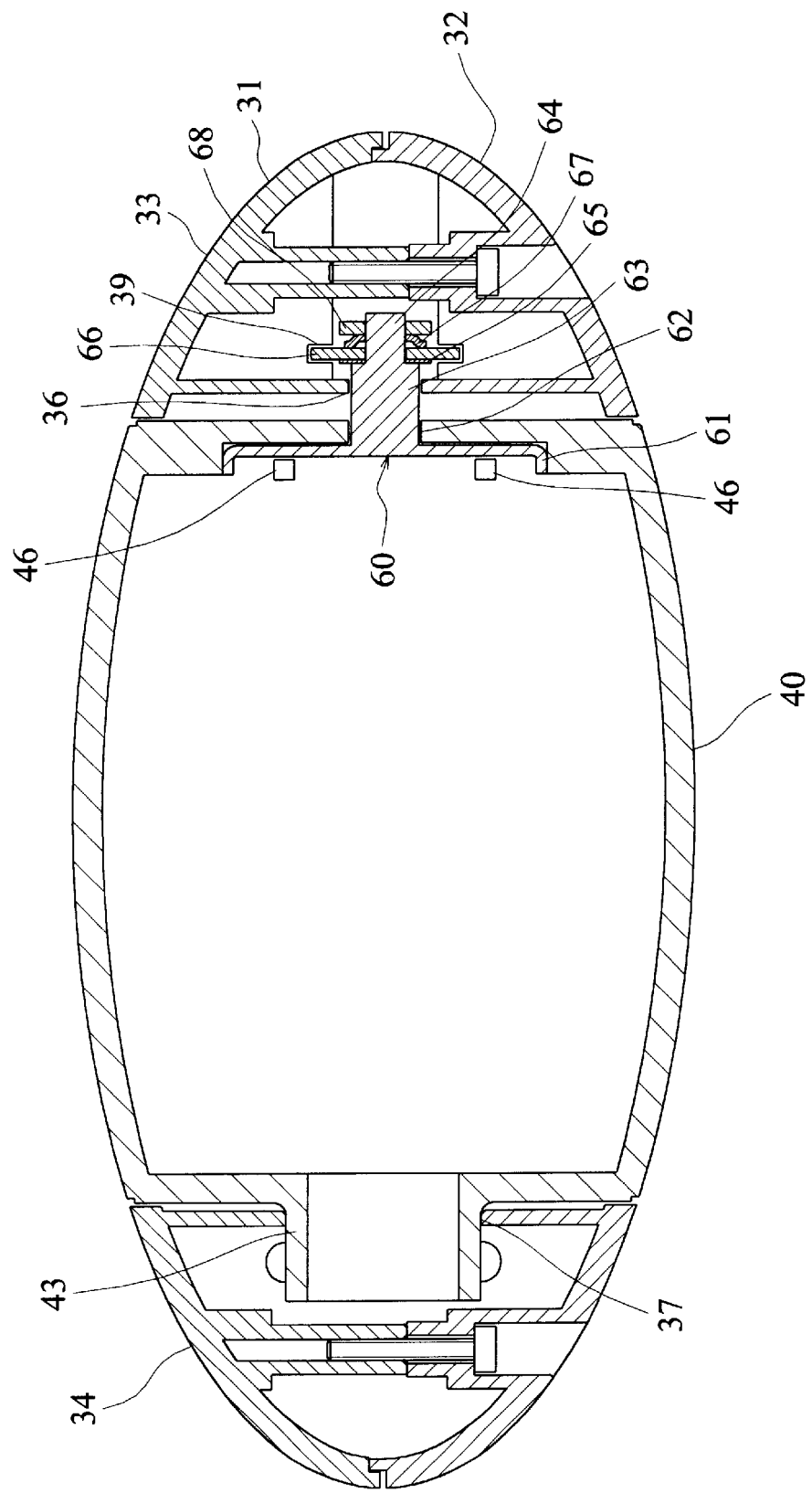
FIG. 4 is an assembled sectional view of the same surveillance camera.

With reference to FIG. 3 and FIG. 4, the body 30, formed by combining together an upper casing 31 and a lower casing 32, has a pair of opposed and spaced pivot supports 33 and 34 with a receiving space 35 formed in between. The pivot support 33 is provided with a first pivot hole 36 and an engaging groove 39. The pivot support 34, on the other hand, is provided with a second pivot hole 37. The body 30 is pivotably connected to the base 20 by use of a conventional ball-and-socket joint formed by a ball portion 38 provided underneath the lower casing 32 and a socket 21 provided on the upper surface of the base 20. This enables the body 30 to swivel horizontally relative to the base 20, and to fine adjust its elevation angle.

The hollow pivotable lens seat 40, formed by combining together a substantially half-barrel-shaped first housing 41 and a substantially half-barrel-shaped second housing 42, has a pivot shaft 43 at one end, and a third pivot hole 44, a recess 45 and securing ribs 46 at the other end, among which the recess 45 and securing ribs 46 are provided inside of the pivotable lens seat 40.

A camera lens 50 (as shown in FIG. 3) is fixed on the first housing 41 of the pivotable lens seat.

Figure 5:
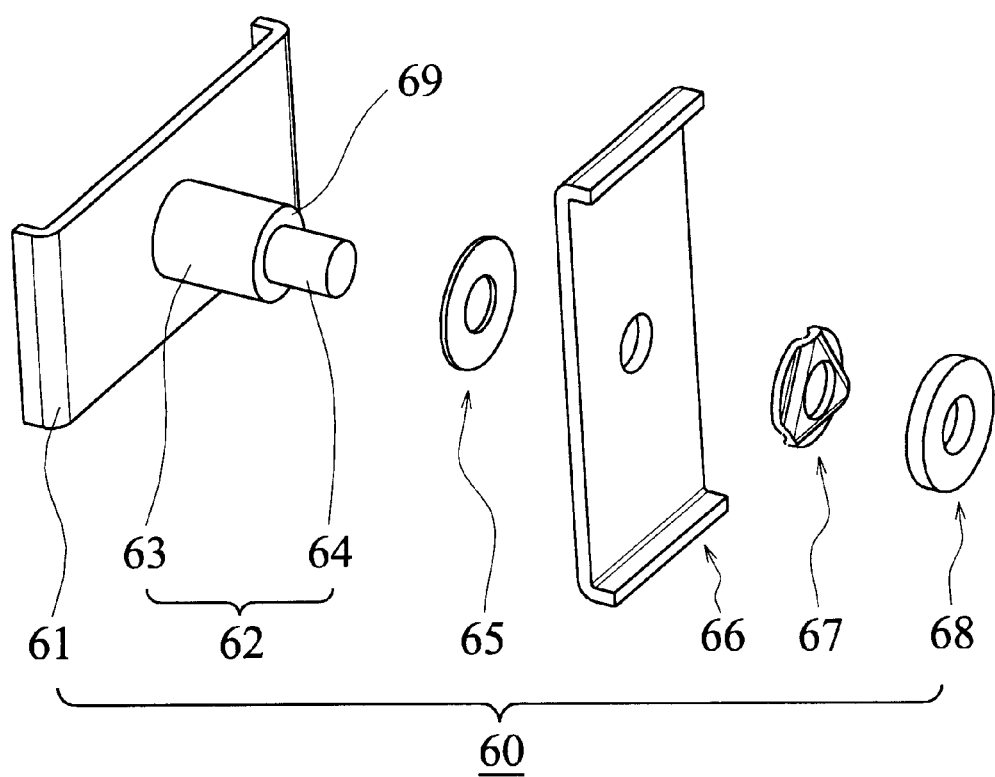
FIG. 5 is an exploded perspective view of a pivot assembly in the same surveillance camera.

With reference to FIG. 5, the pivot assembly 60 includes a first connecting plate 61, a pivot shaft 62, an antifriction washer 65, a second connecting plate 66, a resilient packing 67, and a fastening washer 68. The pivot shaft 62 includes a first shaft segment 63 connected to the first connecting plate 61 and a second shaft segment 64 having a diameter smaller than that of the first shaft segment 63 so as to form a step portion 69 at the juncture thereof. The antifriction washer 65, second connecting plate 66, resilient packing 67, and fastening washer 68 are slipped onto the second shaft segment 64 of the pivot shaft 62 one by one in described order. The fastening washer 68 is further riveted to the second shaft segment 64 of the pivot shaft 62 for pressing the resilient packing 67, the second connecting plate 66, and antifriction washer 65 against the step portion 69 so that the relative pivotal movement between the first connecting plate 61, which is connected to the pivot shaft 62, and the second connecting plate 66 may be damped. In addition, as to be described in more detail later, the first connecting plate 61 and the second connecting plate 66 of the pivot assembly 60 are secured to the pivotable lens seat 40 and the pivot support 33 of the body 30 respectively. Consequently, after the pivotable lens seat 40 is mounted onto the receiving space 35 of the body 30, it can swivel around the body 30 and stop at any desired pivoting positions due to the above damping effect resulted in the relative pivotal movement between the first connecting plate 61 and the second connecting plate 66.

When assembling, the pivot assembly 60 is assembled to the pivotable lens seat 40 first. In specific, the first connecting plate 61 of the pivot assembly 60 is attached to the recess 45 of the pivotable lens seat 40 and secured at that position by securing ribs 46, with the pivot shaft 62 of the pivot assembly 60 extending through so as to be pivotably supported by the third pivot hole 44 of the pivotable lens seat 40. Then, the first housing 41 and the second housing 42 are fastened together. Next, assemble the pivotable lens seat 40 as a whole to the body 30 within the receiving space 35, with the second connecting plate 66 of the pivot assembly 60 being partially inserted into and thus retained by the engaging groove 39 of the body 30, and with the pivot shaft 62 of the pivot assembly 60 further extending through so as to be pivotably supported by the first pivot hole 36 of the pivotable lens seat 40. Meanwhile, the pivot shaft 43 of the pivotable lens seat 40 is pivotably supported by the second pivot hole 37 of the pivot support 34 of the body 30. Then, fasten the upper casing 31 to the lower casing 32.

Figure 6:
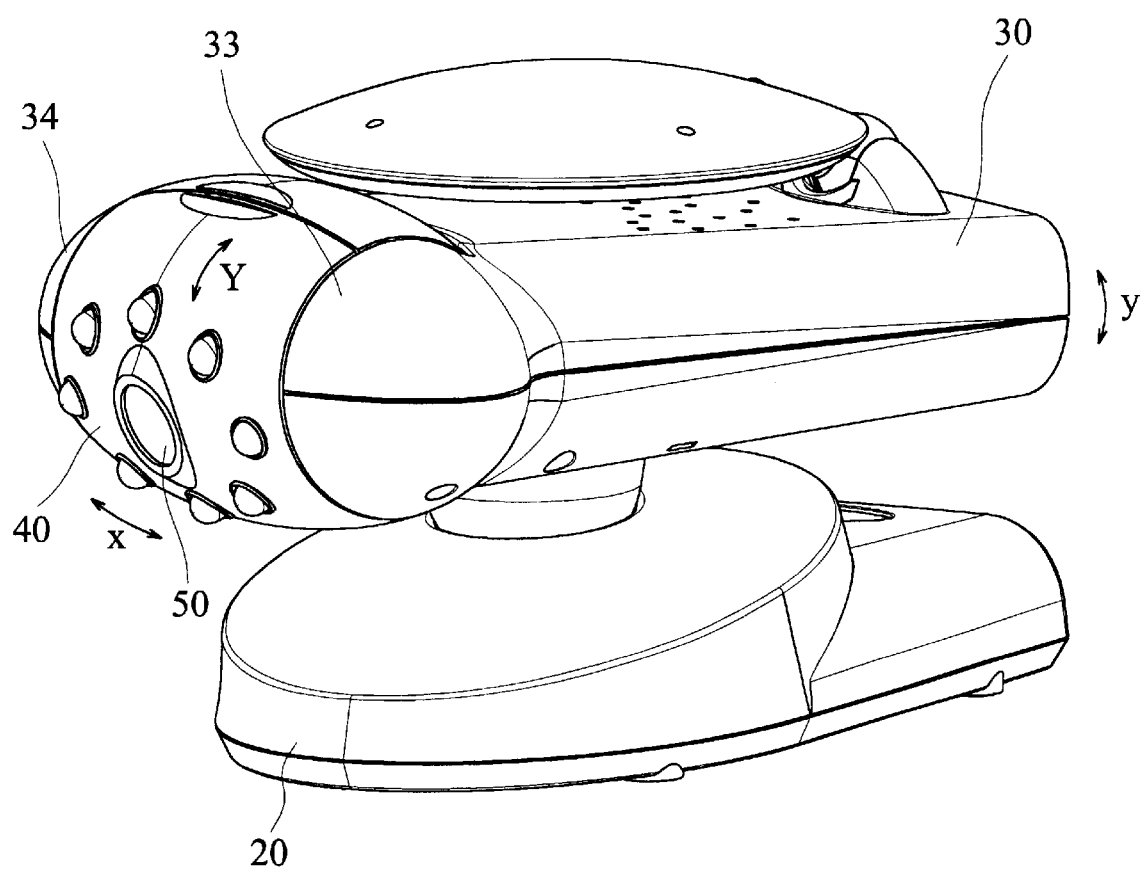
FIG. 6 is a perspective view of the same surveillance camera similar to FIG. 2, showing a state different from that illustrated in FIG. 2 in the azimuth angle and the elevation angle of its camera lens.

With reference to FIG. 6, the operation of the present invention is summarized as follows. When adjusting the angle of the camera lens, the azimuth angle of the body 30 can be adjusted, relative to the base 20, in x direction to any position and the elevation angle of the body 30 in y direction can be fine adjusted also. Besides, the pivotable lens seat 40 can pivot in Y direction relative to the body 30 for adjusting its elevation angle to any desired position. Therefore, by pivoting the body 30 relative to the base 20 and the pivotable lens seat 40 relative to the body 30, the surveillance camera can surveil any angle which as a result will eliminate the blind corner of the surveillance even in the case when the surveillance camera is mounted by attaching its base onto a vertical wall.

While the present invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A surveillance camera with rotary camera lens, comprising:
   a body having a pair of opposed and spaced pivot supports with a receiving space formed there between;
   a pivotable lens seat having two ends and a pivot portion at each of said two ends;
   a camera lens mounted on said pivotable lens seat; and
   a pivot assembly connected between one of said pair of pivot supports of said body and said pivot portion of said pivotable lens seat so that said pivotable lens seat may be pivotably connected to said body within said receiving space, and stopped at any desired pivoting position,
   wherein said pivot assembly comprises a first connecting plate and a pivot shaft including a first shaft segment connected to said first connecting plate and a second shaft segment having a diameter smaller than that of said first shaft segment so as to form a step portion at the juncture thereof,
   wherein said pivot assembly further comprises a second connecting plate, a resilient packing, and a fastening washer slipped onto said second shaft segment in described order so that said fastening washer may urge said resilient packing and said second connecting plate against said step portion for fastening said pivot shaft, said second connecting plate and said resilient packing together, whereby the relative pivotal movement between said first connecting plate, which is connected to said pivot shaft, and said second connecting plate may be damped, and
   wherein said first connecting plate and said second connecting plate of said pivot assembly are, respectively, retained by one of said pair of pivot supports of said body and said pivot portion of said pivotable lens seat so that said pivotable lens seat may be pivotably connected to said body within said receiving space, and stopped at any desired pivoting position.

2. The surveillance camera according to claim 1, wherein said pivot assembly further comprises an antifriction washer slipped onto said second shaft segment and sandwiched between said step portion and said second connecting plate.

3. The surveillance camera according to claim 1, wherein said body is pivotably connected to said base by a ball-and-socket joint.

4. A surveillance camera with rotary camera lens, comprising:
   a body having a pair of opposed and spaced pivot supports with a receiving space formed therebetween;
   a pivotable lens seat having two ends and a pivot portion at each of said two ends;
   a camera lens mounted on said pivotable lens seat; and
   a pivot assembly connected between one of said pair of pivot supports of said body and said pivot portion of said pivotable lens seat so that said pivotable lens seat may be pivotably connected to said body within said receiving space, and stopped at any desired pivoting position,
   wherein said pivot assembly comprises a first connecting plate and a pivot shaft including a first shaft segment connected to said first connecting plate and a second shaft segment having a diameter smaller than that of said first shaft segment so as to form a step portion at the juncture thereof,
   wherein said pivot assembly further comprises a second connecting plate, a resilient packing, and a fastening washer slipped onto said second shaft segment in described order so that said fastening washer may urge said resilient packing and said second connecting plate against said step portion for fastening said pivot shaft, said second connecting plate and said resilient packing together, whereby the relative pivotal movement between said first connecting plate, which is connected to said pivot shaft, and said second connecting plate may be damped,
   wherein said first connecting plate and said second connecting plate of said pivot assembly are, respectively, retained by one of said pair of pivot supports of said body and said pivot portion of said pivotable lens seat so that said pivotable lens seat may be pivotably connected to said body within said receiving space, and stopped at any desired pivoting position, and
   wherein said pivot assembly further comprises an antifriction washer slipped onto said second shaft segment and sandwiched between said step portion and said second connecting plate.

5. The surveillance camera according to claim 4, wherein said body is pivotably connected to said base by a ball-and-socket joint.

6. A surveillance camera with rotary camera lens, comprising:

a body having a pair of opposed and spaced pivot supports with a receiving space formed therebetween;

a pivotable lens seat having two ends and a pivot portion at each of said two ends;

a camera lens mounted on said pivotable lens seat; and a pivot assembly connected between one of said pair of pivot supports of said body and said pivot portion of said pivotable lens seat so that said pivotable lens seat may be pivotably connected to said body within said receiving space, and stopped at any desired pivoting position, wherein said pivot assembly comprises a first connecting plate and a pivot shaft including a first shaft segment connected to said first connecting plate and a second shaft segment having a diameter smaller than that of said first shaft segment so as to form a step portion at the juncture thereof, wherein said pivot assembly further comprises a second connecting plate, a resilient packing, and a fastening washer slipped onto said second shaft segment in described order so that said fastening washer may urge said resilient packing and said second connecting plate against said step portion for fastening said pivot shaft, said second connecting plate and said resilient packing together, whereby the relative pivotal movement between said first connecting plate, which is connected to said pivot shaft, and said second connecting plate may be damped, wherein said first connecting plate and said second connecting plate of said pivot assembly are, respectively, retained by one of said pair of pivot supports of said body and said pivot portion of said pivotable lens seat so that said pivotable lens seat may be pivotably connected to said body within said receiving space, and stopped at any desired pivoting position, and wherein said body is pivotably connected to said base by a ball-and-socket joint.

7. The surveillance camera according to claim 6, wherein said pivot assembly further comprises an antifriction washer slipped onto said second shaft segment and sandwiched between said step portion and said second connecting plate.

* * * * *